May 6, 1930.　　　F. E. CRAWFORD　　　1,756,939
DIFFERENTIAL
Filed Aug. 31, 1927　　　4 Sheets-Sheet 3

Inventor
Frank E. Crawford
By Charles Turner Brown
Atty.

Patented May 6, 1930

1,756,939

UNITED STATES PATENT OFFICE

FRANK E. CRAWFORD, OF YORK, NEBRASKA

DIFFERENTIAL

Application filed August 31, 1927. Serial No. 216,653.

This invention relates to the class of differentials for automobiles which are designed to permit a determined ratio of rotation of the rear and power driven wheels of the automobiles which are controlled thereby, whether the differential used be what is known as spur gear differentials, or bevelled gear wheel differentials, and to automatically prevent a difference in the rotation of said driven wheels in excess of said ratio.

Among the objects of this invention is to obtain a differential which does not require, to any appreciable extent, more power to operate it than is required to operate differentials of the type commonly in use, while at the same time it automatically and positively limits the scope of differentiation to a predetermined ratio. To obtain a differential of the class named which requires no adjustment of any of the members thereof after it is installed, and which is durable. An additional object is to obtain a differential of the class named which does not add materially to the cost of constructing a differential of the common type, which does not require a great number of additional members or parts, and which is simple in construction. An additional object is to obtain a differential of the class named which can be substituted for differentials in common use, with no considerable change in the associated parts of the automobile.

In the drawings referred to, Fig. 1 is a section of a differential constructed to embody my invention, of the type known as spur gear differentials.

Figure 1:
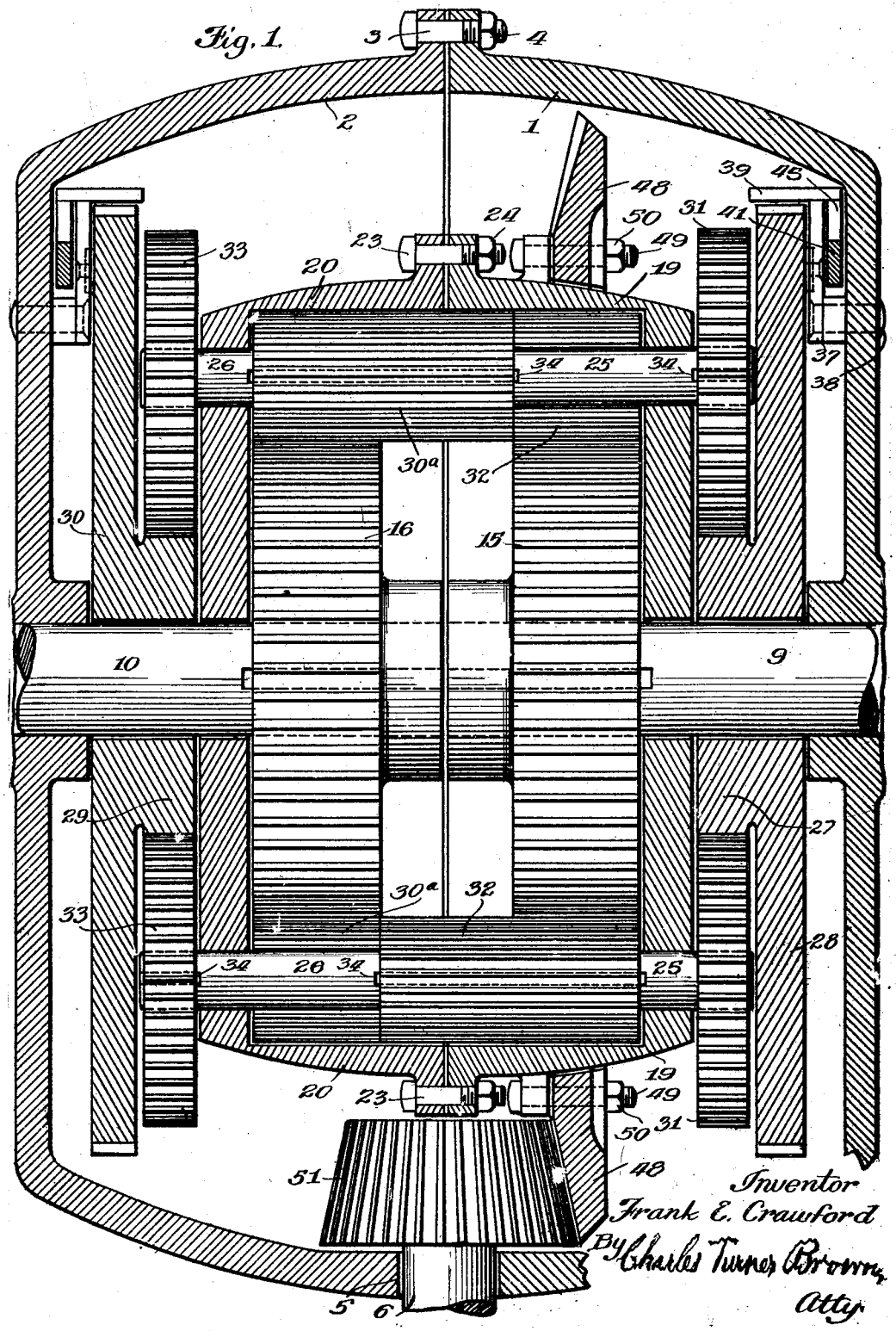

A reference character applied to designate a given part indicates said part throughout the several figures of the drawings wherever the same appears.

Figure 2:
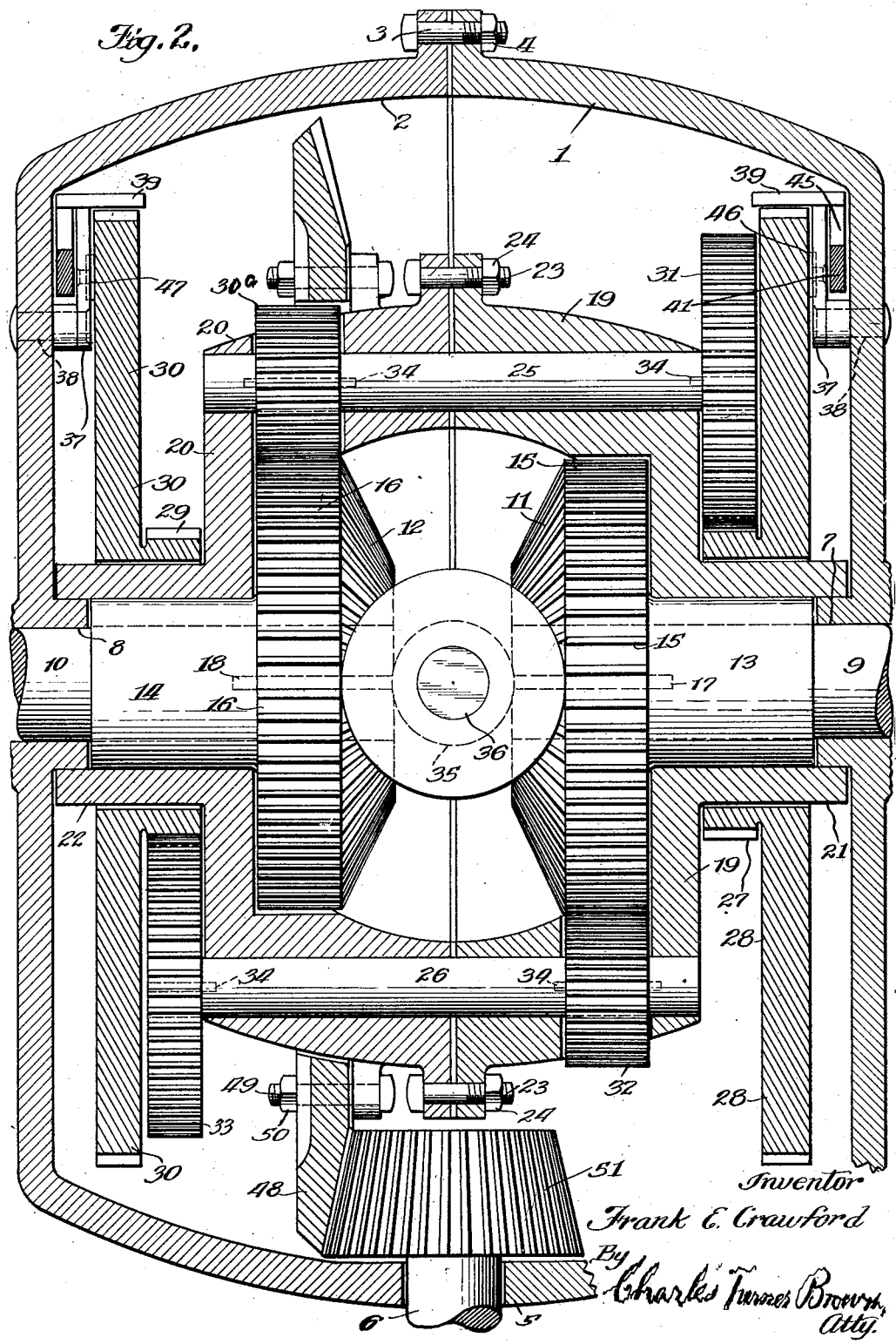
Fig. 2 is a section of a differential embodying this invention of the type known as bevelled gear differentials, taken on line 2—2 of Fig. 3, viewed as indicated by arrows.
Figure 3:
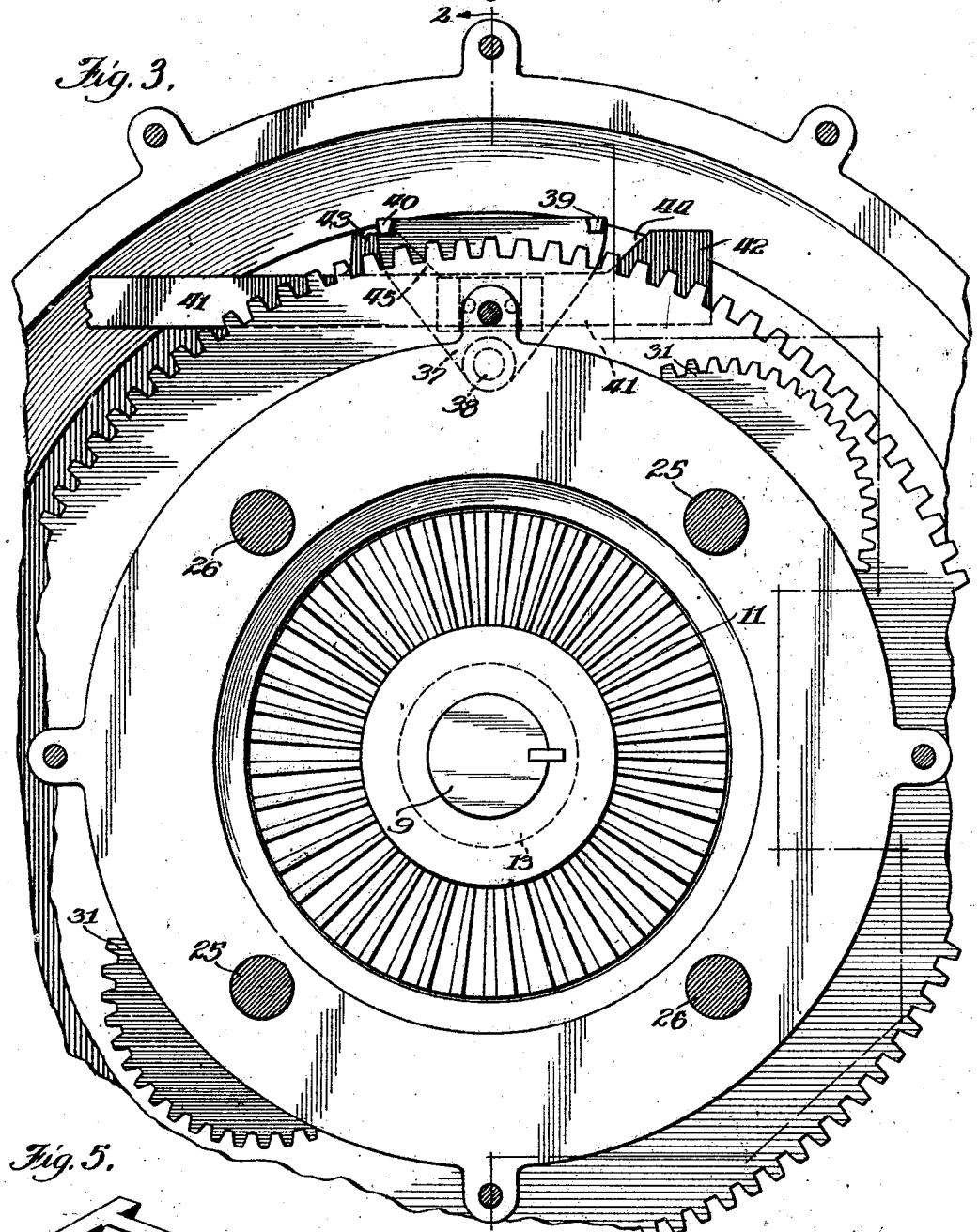
Fig. 3 is a section at an angle of ninety degrees from the section illustrated in Fig. 2, showing the construction illustrated in said Fig. 2.

1, 2, represent the non-rotatable housing of the differential, and is illustrated as consisting of two parts, joined by bolts 3 and nuts 4. 5 represents a journal bearing for the driving shaft 6, of the engine of the automobile. 7, 8, represent journal bearings in housing 1, 2, for the rear axles, 9, 10, of an automobile. 15, 16, represent gears, which are illustrated in Fig. 1 as rigidly secured to axles 9, 10, and in Figs. 2 and 3 as rigidly secured on the hubs of the gear carrier, hereinafter described. 17, 18, represent keys, (Fig. 1), securing wheels 15, 16, to axles 9, 10. 19, 20, represent a differential gear casing, hereinafter termed the planetary gear carrier, or the carrier, which is rotatively mounted on the axles 9, 10. 21, 22, represent the hubs of carrier 19, 20. 23 represent bolts and 24 nuts on said bolts, by means of which the two parts 19, 20, of the carrier are joined together. 30$^a$, 32 represent gears rotatably mounted in carrier 19, 20, on shafts 25, 26.

Gears 30$^a$ and 32, usually termed pinions, intermesh with each other, and respectively intermesh with gears 15, 16, this being the usual construction of spur gear differentials. The shafts of gear pinions 30$^a$ and 32, in the construction embodying my invention, however, are extended beyond the side walls of the carrier 19, 20, and 31, 33 represent gear wheels which are rigidly mounted on the extension of said shafts, to turn therewith. 27, 28, represent gear wheels which are secured together, and are loosely mounted on axles 9, 10. Gear wheel 27 intermeshes with gear wheels 31, and gear wheel 28 serves as a ratchet wheel or a wheel controlled against reverse rotation by a pawl hereinafter described. 29, 30 represent gear wheels which are duplicates of wheels 27, 28, and which also, are secured together. The wheel 29 intermeshes with gear wheels 33, and the wheel 30 serves as a ratchet wheel. 34 represents keys by which the gear wheels 30ª, 31, 32 and 33, respectively, are illustrated as secured to shafts 25, 26. Gear pinions 30ª, and 31, may be integral with shafts 25, 26, if preferred. 37 represents a member which is mounted on pin or bolt 38, to rock freely thereon. 39, 40 represent pawls on member 37, which are alternately held in inoperable position by means about to be described. When one of said pawls is in inoperable position the other is in operable position, to co-act with ratchet wheels 28 and 30; the ones of said pawls in operable position depending on the direction of movement of the automobile. 41 represents a longitudinally movable bar or rod, which is provided with heads 42, 43, having, respectively inclined faces 44, 45. The bar 41 is preferably connected to the reversing gear levers of the automobile, so that when the transmission gears of the automobile are in mesh for the forward travel of the automobile said heads will be in substantially the position in which they are illustrated in Fig. 3, with pawl 40 held by head 43 in inoperable position. When the reverse levers of the automobile are operated to cause the automobile to travel backwards the bars 41 are moved longitudinally to cause head 41 to release pawl 40, and head 42 to maintain pawl 39 in inoperable position.

Figure 5:
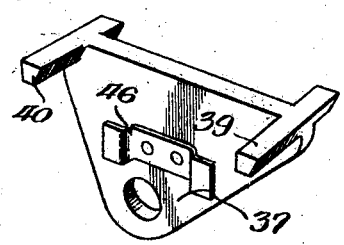
Fig. 5 is a perspective of a rocking member with pawls thereon, forming elements of the several constructions illustrated in Figs. 1, 2, 3 and 4.

46, 47, represent a spring. Spring 46 is a duplicate of the spring 47, and one of said springs is well illustrated in Fig. 5. Springs 46, 47, respectively, are rigidly mounted on a member 37, to press against the sides of wheels 28, 30, respectively.

In the construction illustrated in Figs. 2 and 3, 1, 2, represent the non-rotatable housing of the differential, 3 and 4 the bolt and nut thereon joining the two parts 1, 2 of the housing, 5 a journal bearing for crank shaft 6 of the engine of the automobile, and 7, 8, the journal bearings for axles 9 and 10. 11, 12 represent bevelled gears of the planetary system, and 13, 14 the hubs of gears 11, 12, respectively. Hubs 13, 14 are secured to the axles 9, 10, in the usual manner. In this construction the gear wheels 15, 16, are illustrated as rigidly secured to hubs 13, 14, but these gears can, however, be rigidly mounted on axles 9, 10, the purpose being to cause planetary gears 11, 12 and gears 15, 16, to turn in unison with said shafts or axles. 17, 18 represent keys securing wheels 15, 16 rigidly in place. 19, 20, represent the differential gear carrier which is rotatably mounted on the axles 9, 10, as in the construction illustrated in Fig. 1. The two parts 19, 20 are joined by bolts 23 and nuts 24. 25, 26, represent shafts which are rotatably mounted in carrier 19, 20. 30ª, 32 represent gear wheels which are rigidly secured on the shafts 25, 26, respectively. Gears 30ª and 32 function in the same way, so far as they relate to a construction embodying my invention, as the gears identified by the same characters in Fig. 1, and hence are given the same reference characters. 31 represents a gear wheel rigidly secured on shaft 25, and 33 a similar gear wheel which is rigidly secured on shaft 26. 27, 28 represent gear wheels which are loosely mounted, to turn freely, and are illustrated as turning on hubs 21, 22 of carrier 19, 20. 29, 30, represent gear wheels which are duplicates of wheels 27, 28, and wheels 28, 30, respectively, function as ratchet wheels arranged to co-act with pawls 39, 40, in the same manner as in the construction illustrated in Fig. 1. Gear wheels 27 and 31 intermesh, as do gear wheels 29 and 33. 34 represents the keys which rigidly secure gear wheels 30ª and 31 to shaft 25, and gear wheels 32, 33, to shaft 26. 35 represents a bevelled gear of the planetary system, mounted on shaft 36, said shaft being mounted on carrier 19, 20. 37 represents a member which is mounted to rock on pin or bolt 38, and 39, 40 represent pawls on member 37 arranged to co-act with gear or ratchet wheels 28, 30, as in Fig. 1. 41 represents a longitudinally movable bar, and 42, 43 heads on said bar having inclined faces 44, 45, respectively. The function and action of members, 37, 39, 40, 41, 42 and 43 is the same as hereinbefore described in relation to Fig. 1. In this construction the springs 46, 47, act in the same manner and for the same purpose as in the construction illustrated in Fig. 1. 48 represents a bevelled gear which is rigidly mounted on carrier 19, 20, as by bolts 49 and nuts 50; and 51 represents the usual bevelled gear which is rigidly mounted on shaft 6, to intermesh with gear 48.

Figure 4:
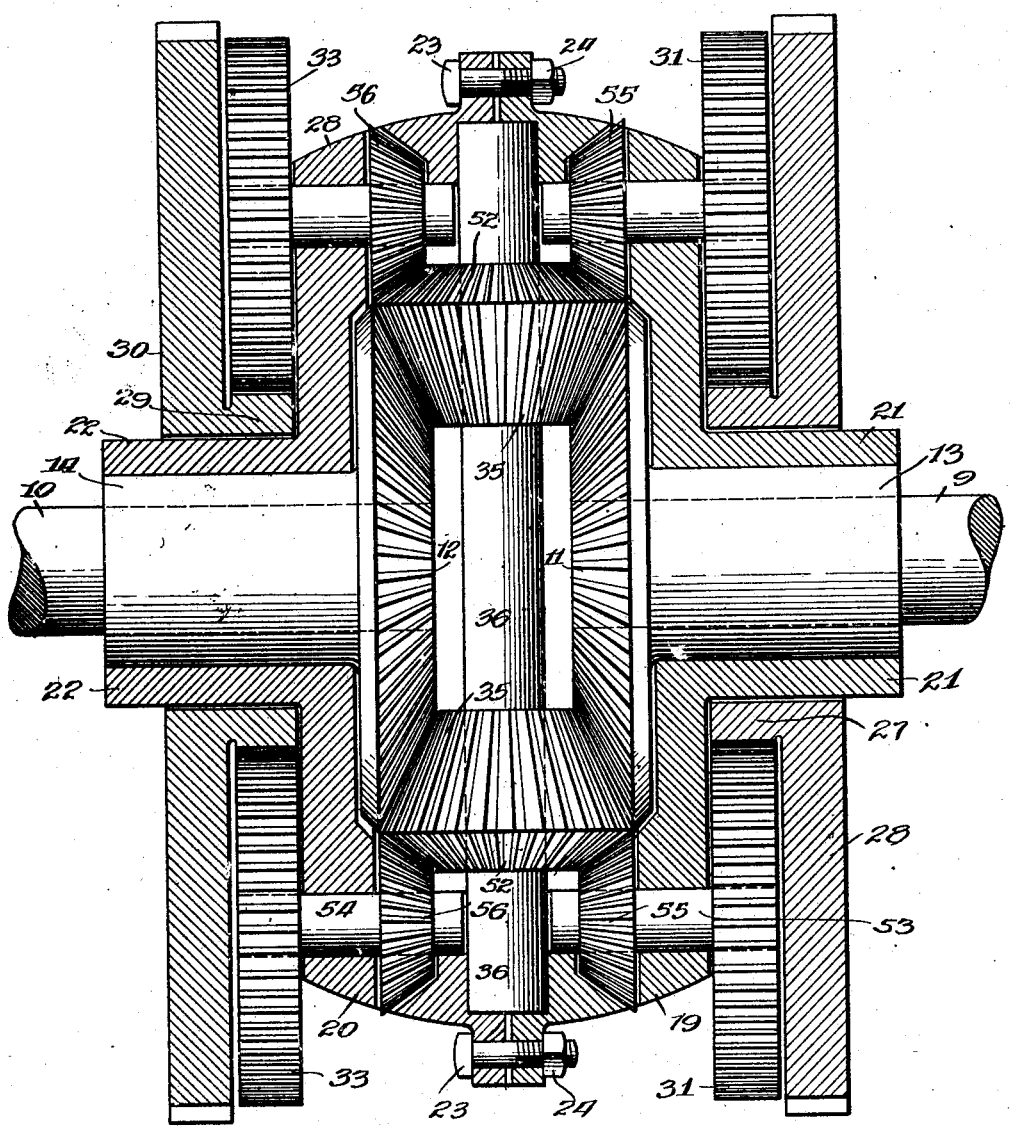
Fig. 4 is a sectional view of the rotatable operating parts of a modification of the construction illustrated in Figs. 2 and 3, with the housing of the differential and the members illustrated in Fig. 5, removed.

In the construction which is illustrated in Fig. 4, 52 represent bevelled gears which are rigidly secured to gears 35, to turn therewith. 53, 54 represent shafts which are rotatively mounted in carrier 19, 20. 55, 56 represent bevelled gears which are rigidly mounted on shafts 53, 54, respectively. 27, 28, 29, 30, 31 and 33, respectively represent gear wheels which function the same as the gear wheels identified by the same characters in Figs. 1, 2 and 3. Wheels 27, 28 are illustrated as loosely mounted on hub 21 of part 19 of the carrier 19, 20, and wheels 29, 30, are illustrated as loosely mounted on hub 22 of said carrier.

The operation of the construction which is illustrated in Fig. 1 is as follows;

Assuming the automobile to be travelling in a straight course, with no slippage of the driving wheels of the automobile, the axles 9, 10, carrier 19, 20, the several gear wheels and shafts mounted in the carrier, and wheels 27, 28 and 29, 30, will rotate as a unit, and the only power required to drive this differential over that required to drive one of common construction will be that due to the friction of springs 46, 47 on the sides of wheels 28, 30.

Assume that wheels 15, 16, each have three times the number of teeth that wheels 30ª and 32 have, say fifty one and seventeen; and that to one revolution of the carrier 19, 20, the axle 9 makes one and one third revolutions. The wheel 15 would also make one and one third revolutions, and the wheel 16 and axle 10 would make two thirds of a revolution and wheels 30ª and 32 with shafts 25, 26, are turned once around their axes. Assume wheels 31, 27, 29 and 33 have the same number of teeth, then the rotation of shaft 25 and wheel 31 once on the rotation of carrier 19, 20 once around, would cause wheel 27 to remain stationary; and wheel 32 and shaft 26 turning around once in the carrier, would cause wheel 29 to turn twice around to each rotation of the carrier. Pawl 40 being held in an inoperable position by head 43 this accelerated rotation of wheel 29, (carrying therewith wheel 30), is permitted.

The above assumed turning of axle 9 one and one third revolutions and of axle 10 two thirds of a revolution, while carrier 19, 20, makes one revolution, is a ratio between said axles of four to two, and permits the turning of the shortest curve which the steering gear of an automobile can effect.

If, because of loss of traction the automobile wheel on axle 9 turns at a greater ratio than four to two, relative to the wheel on axle 10, the gear wheel 16 will be turned less than two thirds of a revolution, and gear wheel 30ª, shaft 25, and gear wheel 31 will turn more than one revolution on their axes while carrier 19, 20, makes one revolution, and the gear wheel 31 will force gears 27, 28 in a direction reverse to the rotation of axle 9. However, a very slight rotation of wheel 28 reverse to that of axle 9 will carry along therewith spring 46 and member 37, rocking said member on its pivot and bringing pawl 39 into engagement with the teeth of said gear wheel 28, thereby holding said wheel stationary and preventing rotation of wheel 31, shaft 25 and gear 30ª; thus locking gear 30ª and 16 together and forcing said gear and axle 10, to which it is secured, to turn in the same direction the carrier is turning and in a ratio of two thirds of a revolution to one revolution of said carrier.

If axle 10 is turned faster than carrier 19, 20, the same operation occurs as above recited, permitting a ratio of four to two between the rear wheels of the automobile, and preventing a greater ratio.

The operation of the construction embodying my invention which is illustrated in Figs. 2 and 3, is the same as above described relative to Fig. 1.

The operation of the construction illustrated in Fig. 4 is as follows: Assuming planetary gears 11, 12 to have twenty four teeth, planetary gears 35 to have twelve teeth, bevelled gears 52 to have eighteen teeth, and gears 31, 33, and 27, 29, to have an equal number of teeth, with bevelled gears 55, 56, having twelve teeth. If axle 9 and planetary gear 11 is rotating faster than the carrier 19, 20, wheels 35 and 52 are rotated, turning gears 55 and 56 and the shafts on which they are rigidly mounted on their axes. The wheels 56, 33 and shaft are rotated to turn wheels 29, 30, in the same direction but at a lower rate of speed, as wheel 11 is turning. When the determined ratio is exceeded, it being with the number of teeth assumed four to two, the operation of wheels 31, 27 and 28, the operation is the same as before described, wheel 12 being positively driven by the locking of wheels 30, 29, 33, 56, 52, 35 and 12.

In a construction embodying this invention, in the trains of gear wheels which include the gear wheels which are rigidly mounted on the members of the divided rear axle of an automobile, and the loosely mounted gear wheels, the rigidly mounted gear wheels are the primary driving wheels and the loosely mounted gear wheels are the final driven wheels, and the intermediate gear wheels are driven wheels when considered relative to its preceding wheel and driving wheels when considered relative to its following wheel.

The term "accelerating ratio" or "ratio accelerating" when applied to the train of wheels which include the gear wheels which are rigidly mounted on the members of the divided axle and the loosely mounted gear wheels, regardless of the number of intermediate gear wheels between them; but at all times including the gear pinions of the differential; means that the last driven wheel (at all times the loosely mounted gear wheel) is driven at a faster rate of revolution than its primary driving wheel, (the gear wheel which is rigidly mounted on a member of the divided axle).

Assuming that both the rear wheels of an automobile are raised from the ground or floor and that the engine is dead.

If one wheel of the automobile be turned in one direction the rotative carrier will remain stationary and the other wheel will be rotated in the opposite direction.

In the construction embodying this invention the train of gear wheels connecting the gear wheels which are rigidly mounted on the members of the divided axle and the loosely mounted gear wheels are constructed so that a given driving series have a greater number of teeth than a given number of driven wheels, so that the last driven wheel of the chain rotates faster than the primary driving wheel, and in the same direction. This construction is termed "accelerating ratio" or "ratio accelerating"; meaning that one loosely mounted wheel rotates in the direction that one of the gear wheels on one of the members of the divided axle rotates and the other loosely mounted wheel rotates in the opposite direction along with the other gear wheel which is mounted on the other member of the divided axle; both said loosely mounted wheels rotating faster than its driving wheel on said member.

The foregoing movement relative to the driving wheels on the members of the divided axle and the corresponding loosely mounted gear wheels holds true if the rotative carrier is rotated and one of the rear wheels of the automobile is rotated faster than the carrier. The other rear automobile wheel must then rotate slower than said carrier. Apparently the result is that the loosely mounted wheel which is driven by the gear wheel on the member of the divided axle which is rotating faster than the carrier has its rotation accelerated; and the loosely mounted wheel which is driven by the gear wheel on the member of the divided axle which is rotated slower than the carrier has its retardation accelerated, so that it comes to a stop and is stationary before its driving wheel becomes stationary.

I claim:

1. In a differential provided with planetary gears, in combination a rotatably mounted differential gear carrier, gears loosely mounted outside said carrier, means to automatically prevent rotation of said gears in a direction reverse to the direction of rotation of said carrier, and accelerating gear wheels rotatively mounted on said carrier, connecting the planetary gears of said differential with said first named gears.

2. In a differential provided with a stationary housing, a rotatable differential gear carrier in said housing, and planetary gears rotatably mounted in said carrier, in combination, gears loosely mounted outside said carrier and within said housing, means to automatically prevent rotation of said gears in a direction reverse to the direction of rotation of said carrier, and accelerating gear wheels rotatively mounted on said carrier, connecting the planetary gears of said differential with said first named gears.

3. In a differential provided with a stationary housing, a rotatable differential gear carrier and planetary gears in said housing, in combination, wheels loosely mounted outside said carrier and within said housing, and intermeshing accelerating gear wheels rotatively controlled by the planet gears of the differential, connecting said planetary gears and said first named wheels, and means to hold one of said first named wheels stationary when a determined ratio of rotation between corresponding wheels of said planetary gears is obtained.

4. In a differential provided with a stationary housing, a rotatable differential gear carrier and planetary gears in said housing, a divided axle and gears rigidly mounted on said axle, in combination, wheels loosely mounted outside said carrier and within said housing, means to automatically prevent rotation of said wheels in a direction reverse to a determined direction of rotation of said carrier, means to control said means to automatically prevent said reverse rotation, and intermeshing gear wheels, rotatively controlled by the planet gears of the differential, connecting said planetary gears and said first named wheels.

5. In a differential provided with a stationary housing, a rotatable differential gear carrier and planetary gears in said housing, in combination, wheels loosely mounted outside said carrier and within said housing, a frame pivotally mounted on and within said housing, pawls on said frame arranged to co-act with said first named wheels to prevent rotation thereof in a direction reverse to the direction of rotation of said carrier, means to control the direction of the pivotal movement of said frame, and intermeshing gear wheels connecting said planetary gears and said first named wheels, said intermeshing gears arranged to control the ratio of rotation of said first named wheels to that of said planetary gears.

6. In a differential provided with a stationary housing, a rotatable differential gear carrier and planetary gears in said housing, in combination, wheels loosely mounted outside said carrier and within said housing, a frame pivotally mounted on and within said housing, pawls on said frame arranged to co-act with said first named wheels to prevent rotation thereof in a direction reverse to the rotation of said carrier, a longitudinally movable bar, heads on said bar arranged to co-act with said frame to control the pivotal movement thereof, and intermeshing gear wheels arranged to control the ratio of rotation of said planetary gears.

7. A differential unit including a rotative carrier mounted on a pair of axles driven thereby, in combination, connecting means between said axles and said carrier, loosely mounted wheels rotatable around said axles, intermeshing gears between said connecting means and said loosely mounted wheels, pawls associated with and frictionally operable by and operable on said loosely mounted wheels, and means operable from a remote point to hold said pawls in neutral position when said carrier is turned in a determined direction.

8. A pair of axles, a differential including a rotatable carrier and planetary gears operatively connected with said axles, and loosely mounted gear wheels associated with said carrier, in combination with automatically operable means for maintaining said loosely mounted wheels against reverse rotation, whereby when said gears act within determined ratios said differential functions and when said action reaches the determined limit of said ratios said loosely mounted gear wheels function to positively drive said axles.

9. In a differential, a differential gear carrier, gears rigidly mounted on a divided axle, gears rotatively mounted to turn loosely around said axle gears rotatively mounted on said carrier to connect said rigidly mounted and said loosely mounted gears, said connecting gears functioning, when one of said rigidly mounted gears is accelerated and the other retarded to accelerate one of said loosely mounted gears and to retard the other in a greater ratio than said rigidly mounted gears, in combination with automatic means to prevent rotation of said loosely mounted wheels reverse to the rotation of said carrier.

10. A loosely mounted wheel provided with teeth on its periphery, in combination with a frame loosely mounted on a stationary pivot, pawls on said frame, said frame being in frictional engagement with said wheel, and means independently of said frictional engagement to hold said frame with said pawls in neutral position when said wheel is revolved in a determined direction and to permit said frame to be rocked on said pivot by said frictional engagement to bring one of said pawls into engagement with said teeth when said wheel is revolved in the reverse direction.

11. In combination with a stationary housing, a pair of axles, gear wheels rigidly mounted on said axles, a rotative carrier on said axles, gear pinions rotatively mounted in said carrier, and loosely mounted gear wheels in said housing, said pinions operatively connected to said rigidly mounted wheels to control the relative rotation thereof and operatively connected to said loosely mounted wheels to drive said loosely mounted wheels, the ratio of said operative connections between said rigidly mounted wheels and said loosely mounted wheels, said connections including said pinions accelerating the rotation of the loosely mounted wheel which corresponds with the rigidly mounted wheel which is rotating faster than said carrier, and said ratio rotating the loosely mounted wheel which corresponds with the rigidly mounted wheel which is turning slower than said carrier to rotate slower than and to become stationary before said last named rigidly mounted wheel becomes stationary, and means to prevent reverse rotation of said last named loosely mounted wheel.

FRANK E. CRAWFORD.